March 28, 1933.  C. R. DAVIS  1,903,258

AUTOMOBILE LICENSE PLATE HOLDER

Filed Jan. 12, 1932

INVENTOR
Clarence R. Davis.
BY
ATTORNEY

Patented Mar. 28, 1933

1,903,258

UNITED STATES PATENT OFFICE

CLARENCE R. DAVIS, OF DETROIT, MICHIGAN, ASSIGNOR TO DAVIS TOOL & ENGINEERING COMPANY, OF DETROIT, MICHIGAN, A CORPORATION OF MICHIGAN

AUTOMOBILE LICENSE PLATE HOLDER

Application filed January 12, 1932. Serial No. 586,186.

My invention relates to an improved automobile license plate holder and particularly to such a holder in which the back of the license plate is completely concealed and all edges of the plate are concealed by a framework of ornamental appearance.

The unattractive appearance of the edges and back of the conventional license plate has concerned automotive designers for some time. However, the different sizes of license plates in use in the various States and the different lengths of the license plates in each State has made it difficult to provide any sort of a license plate holder which is ornamental in appearance and which will completely conceal the back and edges of the license plate carried therein.

Due to the lack of any standard of width or length of the plates in use, it is not possible to provide a universal license plate holder, so that it is essential that any such license plate holder must be capable of ready changes to accommodate the particular size of license plates to be carried therein. Such changes also must be made without impairing the ornamental appearance of the device.

Likewise, such a holder should eliminate unnecessary rattle between the license plate and the holder and should hold the license plate firmly in place without the necessity of using lock washers, nuts, and the like, secured to bolts passing through the holder and through the license plates.

Likewise, the ease of insertion or removal of the license plates in such a holder is of utmost importance.

It is, therefore, an object of my present invention to provide an ornamental holder for automobile license plates in which the back and sides of the license plate are effectively concealed.

It is a further object of my present invention to provide a license plate holder in which the license plate is held in the holder without rattle of the plate, and in which it is not necessary to hold the plate in place by bolts or similar means passing through the license plates and the holder.

It is a further object of my present invention to provide a holder for automobile license plates in which the license plates may be readily inserted or withdrawn from the holder.

These, and various other objects, features of arrangement, construction and operation, are plainly shown and described and will be best understood by reference to the accompanying drawing showing a preferred embodiment of my invention, in which.

Similar reference numerals refer to similar parts throughout the several views.

Figure 1:
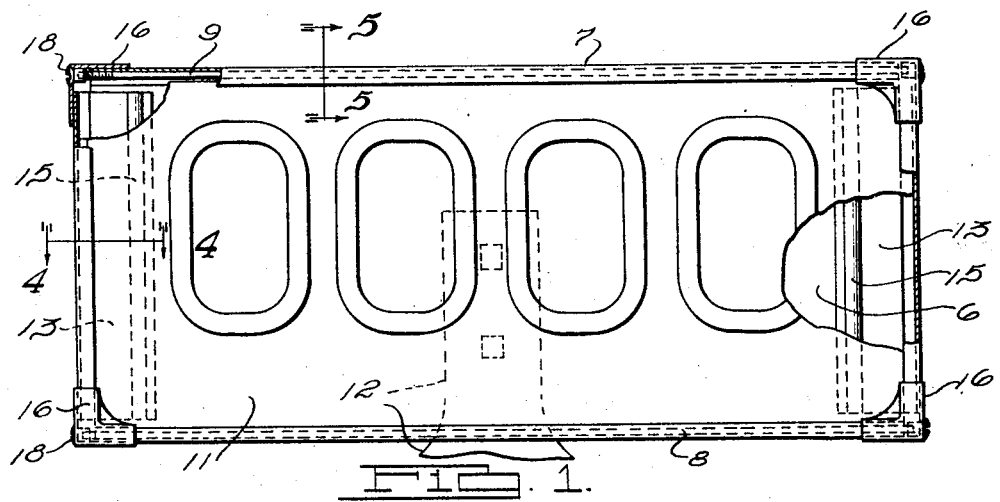
Fig. 1 is a front elevation of a device embodying my invention having a license plate inserted therein.

A license plate holder embodying my invention is constructed of a back portion 6, having turned flanged edges 7 and 8 extending lengthwise on the top and bottom of the back portion 6. Inserted in each of the turned edge portions 7 and 8 is a screw-threaded rod 9 which extends at each end beyond the extension of the turned flanges 7 and 8.

Figure 2:
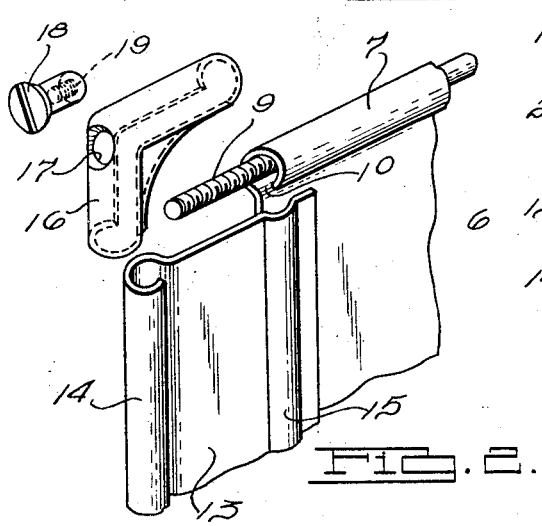
Fig. 2 is a fragmentary perspective view showing the parts of a device embodying my invention prior to assembly.
Figure 5:
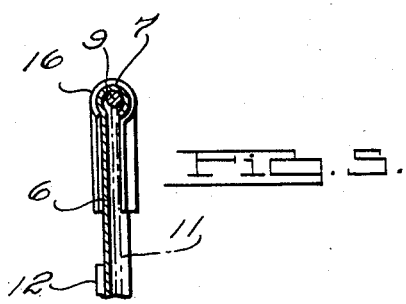
Fig. 5 is a sectional view taken on the line 5—5 of Fig. 1.

The ends of the back portion 6 are cut off at right angles to the flanges 7 and 8. The turned flanges 7 and 8 are formed as shown in Fig. 2 with an opening 10 between the end of the flange and the back of the holder 6. This is shown clearly in Fig. 5, in which the license plate 11 is shown contacting with the end of the turned flange 7 and is held against the end of this turned flange 7.

The back plate 6 and the flanges 7 and 8 may be made in any desired width and the flanges may be turned to any desired extent to accommodate license plates of varying widths of the different States. It has been found that by the provision of flanges 7 of suitable widths standard widths may be made up to accommodate various sizes of license plates. The provision of the square ends on the back 6 permits the back 6 to be cut at any desired point to provide for varying lengths of plates to be carried in the holder.

Figure 4:
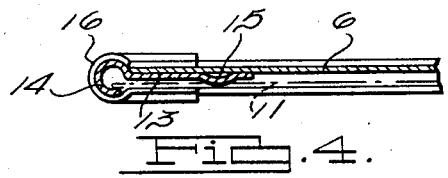
Fig. 4 is a sectional view taken on the line 4—4 of Fig. 1.

The back 6 is secured to a bracket 12 which is carried by the automobile and acts to support the license plate holder and the plate carried by it. An end member 13, having a turned flange 14 and a curved projecting portion 15, is provided of a suitable length to accommodate the width of the back 6 between the ends of the flanges 7 and 8. The member 13, as shown in Fig. 2, is adapted to slide over the back 6 and, as shown in Fig. 4, to be inserted between the back 6 and the license plate 11.

Corners 16 are provided with turned flanges which slide over the flanges 7 and 8 of the back member 6 and over the flanges 14 on the end members 13. Each of the corner members 16 is provided with a countersunk hole which fits over the end of the rod 9. A windshield cap nut 18 extends through the countersunk hole 17 and is screw-threaded with female screw threads 19 to fit over the threads of the extending member 19.

Figure 3:
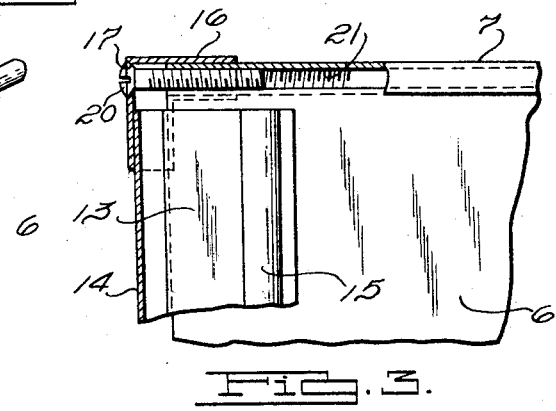
Fig. 3 is a fragmentary view of one corner of a device embodying my invention showing an alternative method of assembling the structure.

While this method of securing the parts of the license plate holder is my approved method, another method which I have found to be successful consists in the use of a bolt 20, shown in Fig. 3, extending through the countersunk hole 17 in the corner 16 and the provision of internal screw threads 21 inside the turned flanges 7 and 8 of the back 6.

The operation of my invention is as follows:

A back 6 of suitable width to accommodate the license plate to be carried in the holder is cut to the suitable length to accommodate the length of the license plate to be carried therein. The rod 9 is removed from the flanges 7 and 8 and is cut to a corresponding length, allowing a sufficient amount to project beyond the ends of the flanges 7 and 8.

The rod 9 is then inserted in the flanges 7 and 8 and projects from the ends thereof. The license plate is then inserted in the holder and is held in place by contact with the ends of the flanges 7 and 8 and the back 6. The end members 13 are then inserted between the license plate 11 and the back 6, and the extending portion 15 of the member 13, as it moves under the license plate, pushes it forwardly for tight contact with the ends of the flanges 7 and 8.

The corners 16 are then inserted over the flanges 7 and 8 and the flanges 14 of the end members 13, and the cap nut 18 is inserted in the countersunk hole 17 and is tightened on the rods 9. This fastens the ends 13 securely in place in the holder and wedges the portion 15 under the license plate 11, which results in the elimination of rattle between the license plate and the holder.

In the other embodiment of my invention shown in Fig. 3, the only difference from the above is that when the back 6 and the flanges 7 and 8 are cut to the desired length there is no necessity for the use of a rod 9 in that the inside of the flanges 7 and 8 are tapped with screw threads to accommodate the bolt 20 used in place of the cap nut 18 to hold it in place.

While I have illustrated a preferred embodiment of my invention, many modifications may be made without departing from the spirit of the invention, and I do not wish to be limited to the precise details of construction as herein set forth, but desire to avail myself of all changes within the scope of the appended claims.

Having thus described my invention, what I claim is new and desire to secure by Letters Patent of the United States is:

1. An automobile license plate holder including a back plate having longitudinal flanged edge portions, a plurality of independent end members each having a flanged edge portion, said flanged portion corresponding in size and shape to the flanged portion of said longitudinal flanged edges of said back plate, a plurality of corner members adapted to telescope over the flanged portions of the edges of said back portion and the flanged portion of said end members, and means concealed within said longitudinal flanged edges and extending through said corner members for securing the said end members in place, and means secured to said back plate for securing said holder to an automobile.

2. An automobile license plate holder including a back plate having longitudinal flanged edge portions, a plurality of independent end members each having an extending portion adapted to be wedged under a license plate between the license plate and said back, and each having a flanged edge portion, and a plurality of corner members adapted to telescope over the flanged portion of said edge portion and the flanged edge portion of said end members, and means concealed within said longitudinal flanged edges and extending through said corner members for securing the end members in place.

3. An automobile license plate holder including a back plate having longitudinal flanged edge portions, a plurality of independent end members each having an extending portion adapted to be wedged under a license plate between the license plate and the said back, a plurality of corner members adapted to telescope over the flanged portion of said edge portions and each of the said independent end members, and means concealed within said longitudinal flanged edges and extending through said corner members for securing the end members in place.

4. An automobile license plate holder including a back plate having longitudinal flanged edge portions, a plurality of independent end members each having an extending portion adapted to be wedged under a license plate between the license plate and said back, means integral with said extending portion to increase its wedging effect, and each of said independent end members having a flanged edge portion, a plurality of corner members adapted to telescope over the flanged portion of said edge portion and the flanged edge portion of said end members, and means concealed within said longitudinal flanged edges and extending through said corner members for securing the end members in place.

5. An automobile license plate holder including a back plate having longitudinal flanged edge portions, a plurality of independent end members each having an extending portion adapted to be wedged under a license plate between the license plate and the said back, means integral with said extending portion to increase its wedging effect, a plurality of corner members adapted to telescope over the flanged portion of said edge portions and the said independent end members, and means concealed within said longitudinal flanged edges and extending through said corner members for securing the end members in place.

6. An automobile license plate holder including a back plate having longitudinal flanged edge portions, a plurality of independent end members each having a flanged edge portion, and a plurality of corner members adapted to telescope over the flanged portion of said edge portions and the flanged edge of said end members, and means concealed within said longitudinal flanged edges and extending through said corner members whereby a license plate may be held in said holder by contact with the said flanges on all four edges without direct contact between said license plate and said securing means.

7. An automobile license plate holder including a back plate having longitudinal flanged edge portions, a plurality of independent end members each having an extending portion adapted to be wedged under a license plate between the license plate and said back, and each having a flanged edge portion, and a plurality of corner members adapted to telescope over the flanged portion of said edge portion and the flanged edge portion of said end members, and means concealed within said longitudinal flanged edges and extending through said corner members for securing the end members in place, and including a screw-threaded rod extending beyond the ends of said flanged edges and to a point adjacent the inside of said corner members, and cap screws extending through said corner members and adapted to engage with the ends of said screw-threaded rod.

8. An automobile license plate holder including a back plate having longitudinal flanged edge portions, a plurality of independent end members, each of said independent end members having a flanged edge portion, a plurality of corner members adapted to telescope over the flanged portion of said edge portion and the flanged edge portion of said end members, and means concealed within said longitudinal flanged edges and extending through said corner members for securing the end members in place.

9. An automobile license plate holder including a back plate having longitudinal flanged edge portions, a plurality of independent end members, each of said independent end members having a flanged edge portion, a plurality of corner members adapted to telescope over the flanged portion of said edge portion and the flanged edge portion of said end members, and means passing through said corner members for securing the corner members in place and including a screw-threaded member passing through each of said corner members, each of said screw-threaded members being engaged by complemental screw-threaded members carried inside said flanged portions.

10. An automobile license plate holder including flanged members adapted to engage the sides of an automobile license plate, and means for holding said flanged members in place and including a plurality of corner members adapted to telescope over said flanged members and screw-threaded rods concealed within certain of said flanges and extending inside said corner members, and cap screws passing through said corner members and adapted to make screw-threaded engagement with said rods inside said corner members.

In witness whereof, I hereunto subscribe my name this 28th day of December, 1931.

CLARENCE R. DAVIS.